(12) United States Patent
Mao et al.

(10) Patent No.: US 6,238,534 B1
(45) Date of Patent: May 29, 2001

(54) HYBRID MEMBRANE ELECTRODE ASSEMBLY

(75) Inventors: Shane S. Mao, Woodbury; Gregory Meis Haugen, Edina; Krzysztof A. Lewinski, Oakdale; Mark Kevitt Debe, Stillwater, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/312,514

(22) Filed: May 14, 1999

(51) Int. Cl.[7] .................................................. G01N 27/26
(52) U.S. Cl. .................... 204/416; 204/415; 204/280; 204/291; 204/292; 429/40; 429/41
(58) Field of Search ..................................... 204/415, 418, 204/419, 282, 280, 242, 291, 292, 416; 429/40, 41, 209

(56) References Cited

U.S. PATENT DOCUMENTS

| | | |
|---|---|---|
| 4,812,352 | 3/1989 | Debe ..................................... 428/142 |
| 5,039,561 | 8/1991 | Debe ................................. 427/255.6 |
| 5,176,786 | 1/1993 | Debe ..................................... 156/600 |
| 5,238,729 | 8/1993 | Debe ..................................... 428/245 |
| 5,336,558 | 8/1994 | Debe ..................................... 428/323 |
| 5,338,430 | 8/1994 | Parsonage et al. ................... 204/412 |
| 5,879,827 | 3/1999 | Debe et al. ............................ 429/40 |
| 5,879,828 | 3/1999 | Debe et al. ............................ 429/41 |

OTHER PUBLICATIONS

Liu L et al.; "Carbon Supported And Unsupported Pt–Ru–Anodes For Liquid Feed Direct Methanol Fuel Cells", *Electrochimica Acta, Gb. Elsevier Science Publishers, Barking*, vol. 43, No. 24, Aug. 21, 1998, pp. 3657–3663.

Primary Examiner—T. Tung
Assistant Examiner—Alex Noguerola
(74) Attorney, Agent, or Firm—Philip Y. Dahl

(57) ABSTRACT

Hybrid membrane electrode assemblies (MEAs) are presented, having an anode comprising a dense distribution of catalyst that may be borne on small, high-aspect ratio supports, such as nanostructured elements, and a cathode comprising a less dense distribution of catalyst that may be borne on lower-aspect ratio supports, such as carbon particle supported catalyst.

30 Claims, 2 Drawing Sheets

HYBRID MEMBRANE ELECTRODE ASSEMBLY

FIELD OF THE INVENTION

This invention relates to a hybrid membrane electrode assembly (MEA) having an anode comprising a dense distribution of catalyst that may be borne on small, high-aspect ratio supports, such as nanostructured elements, and a cathode comprising a less dense distribution of catalyst that may be borne on lower-aspect ratio supports, such as carbon particle supported catalyst.

BACKGROUND OF THE INVENTION

A membrane electrode assembly (MEA) may be the central element of electrochemical devices such as proton exchange membrane fuel cells, sensors, electrolyzers, chloralkali cells, and the like. Such MEAs typically comprise an ion conductive membrane (ICM), which functions as a solid electrolyte, in contact with electrode layers that include catalytic electrode material such as platinum. In a typical electrochemical cell, an ICM is in contact with a cathode layer and an anode layer, and transports ions that are formed at the anode to the cathode, allowing electrical current to flow in an external circuit connecting the electrodes.

One form of catalyst used in MEAs consists of Pt or Pt alloys coated onto carbon particles by wet chemical methods, such as the reduction of chloroplatinic acid. This conventional form of catalyst is dispersed with ionomeric binders, solvents and often polytetrafluoroethylene (PTFE) particles, to form an ink, paste or dispersion that is applied to either the ICM or to an electrode backing material to be placed adjacent to the ICM. In addition to providing mechanical support, it is generally believed in the art that carbon support particles provide necessary electrical conductivity within the electrode layer.

In another variation, Pt fines can be mixed directly with a solution of solvents and polymer electrolyte or Teflon™ and coated onto the electrode backing layer or membrane ICM. However, because of limitations on how small the fines can be made, this approach typically results in very high loading of the catalyst with resulting increase in expense.

Nanostructured composite articles are disclosed in U.S. Pat. Nos. 4,812,352, 5,039,561, 5,176,786, 5,336,558, 5,338,430, and 5,238,729. U.S. Pat. No. 5,338,430 discloses that nanostructured electrodes embedded in solid polymer electrolyte offer superior properties over conventional electrodes employing metal fines or carbon supported metal catalysts, including more efficient use of the electrode material and enhanced catalytic activity per unit mass of Pt.

U.S. Pat. No. 5,879,828 concerns MEAs having electrode layers comprising nanostructured elements. U.S. Pat. No. 5,879,827 concerns nanostructured elements bearing nanoscopic catalyst particles which may be suitable for use in MEAs.

SUMMARY OF THE INVENTION

Briefly, the present invention provides a hybrid membrane electrode assembly (MEA) having an anode layer and a cathode layer wherein catalyst material is borne on support particles, wherein the average density of the first catalyst material in the anode layer is greater than 1.0 mg/mm$^3$ and average density of the second catalyst material in the cathode layer is less than 1.0 mg/mm$^3$.

In another aspect, the present invention provides a hybrid MEA wherein the electrochemical surface area/volume ratio of the catalyst material in the anode layer is greater than 200 cm$^2$/mm$^3$ and wherein the electrochemical surface area/volume ratio of the catalyst material in the cathode layer is less than 200 cm$^2$/mm$^3$.

In another aspect, the present invention provides a hybrid MEA having an anode layer comprising a catalyst material borne on support particles having an average aspect ratio of greater than 3 and a cathode layer comprising a catalyst material borne on support particles having an average aspect ratio of less than 3.

What has not been described in the art, and is provided by the present invention is a hybrid MEA showing improved performance by the use of a dense distribution of catalyst in the anode layer, preferably by use of nanostructured elements, and a less dense distribution of catalyst in the cathode layer, which may be achieved by the use of carbon-supported catalyst.

In this application:

"electrochemical surface area" means the surface area available for participation in an electrochemical reaction as determined by H$_2$ adsorption/desorption;

"membrane electrode assembly" means a structure comprising a membrane that includes an electrolyte and at least one but preferably two or more electrodes adjoining the membrane;

"microtextures" means surface structures, features or convolutions made by any process, including impression, molding or etching, whose average depth is between 1 and 100 micrometers;

"nanostructured element" means an acicular, discrete, microscopic structure comprising a catalytic material on at least a portion of its surface;

"microstructure" means an acicular, discrete, microscopic structure;

"nanoscopic catalyst particle" means a particle of catalyst material having at least one dimension of about 10 nm or less or having a crystallite size of about 10 nm or less, measured as diffraction peak half widths in standard 2-theta x-ray diffraction scans;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

It is an advantage of the present invention to provide MEAs having improved performance characteristics for use in electrochemical cells including fuel cells.

DETAILED DESCRIPTION OF PREFERRED EMBODIMENTS

Figure 1:
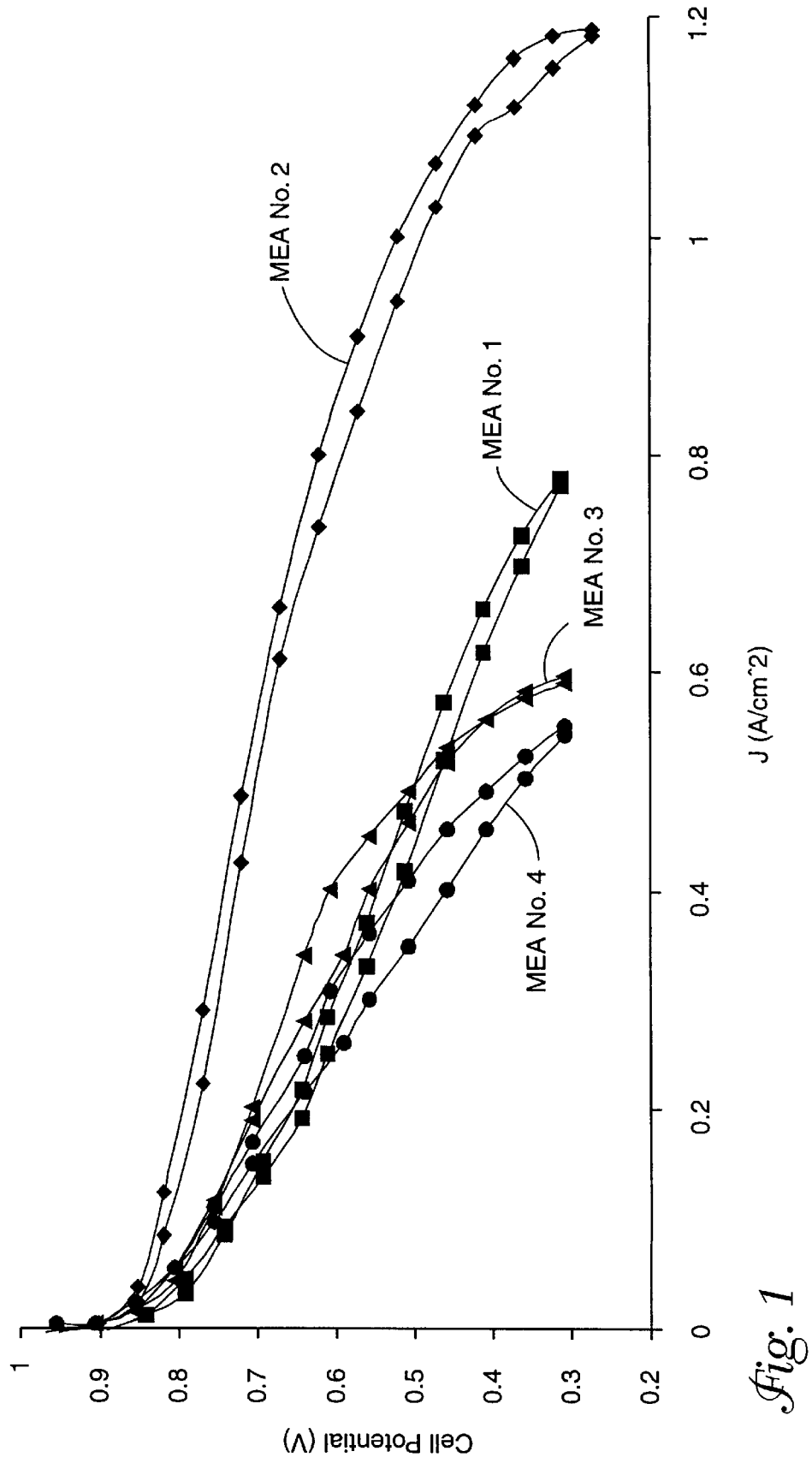
FIG. 1 is a graph of polarization curves measured for a hybrid MEA of the present invention and three comparative MEAs.

The present invention provides a hybrid membrane electrode assembly (MEA) having an anode comprising a dense distribution of catalyst that may be borne on small, high-aspect ratio supports, such as nanostructured elements, and a cathode comprising a less dense distribution of catalyst that may be borne on lower-aspect ratio supports such as carbon particle-supported catalyst. Without wishing to be bound by any theory, it is believed that the present invention improves MEA performance by providing excellent water management on both electrodes.

The anode catalyst layer advantageously comprises a relatively thin layer. Preferably the anode layer is less than 2 micrometers in thickness and more preferably less than 1 micrometer.

The cathode catalyst layer advantageously comprises a relatively thick layer. Preferably the cathode layer is greater than 5 micrometer in thickness and more preferably greater than 10 micrometers.

The anode and cathode catalyst materials may be any effective materials. Typical catalysts contain platinum, and may contain additional elements such as ruthenium. Preferably, the catalyst is a platinum containing alloy or layered combination of platinum and a second element, as disclosed in U.S. Pat. No. 5,879,828, the disclosure of which is incorporated herein by reference.

The distribution of catalyst material in the anode and cathode layers may be described in terms of the electrochemical surface area/volume ratio or in terms of the mass/volume ratio or mass density.

The electrochemical surface area/volume ratio may be determined by the $H_2$ adsorption/desorption method, such as described in Canadian Patent Application 2,195,281, the disclosures of which are incorporated herein by reference. This method is based on the phenomena of $H_2$ adsorption/desorption on Pt at the potentials immediately preceding the hydrogen evolution. It is known that hydrogen monolayer will adsorb on a Pt surface and exchange 220 $\mu C$ of charge per 1 $cm^2$ of Pt area in the process. By integration of adsorption/desorption peaks of hydrogen a real-to-geometrical surface area factor can be calculated.

The electrochemical surface area/volume ratio of the anode layer is preferably greater than 200 $cm^2/mm^3$, more preferably greater than 300 $cm^2/mm^3$ and most preferably greater than 500 $cm^2/mm^3$. The electrochemical surface area/volume ratio of the cathode layer is preferably less than 200 $cm^2/mm^3$ and more preferably less than 150 $cm^2/mm^3$ and most preferably less than 100 $cm^2/mm^3$.

The mass density, or mass/volume ratio of catalyst material in each layer may be determined by dividing the mass of catalyst applied by the volume of the catalyst layer. The thickness of the layer may be determined by inspection of a membrane cross-section by electron microscopy.

The mass density of the anode layer is preferably greater than 1.0 $mg/mm^3$, more preferably greater than 2.0 $mg/mm^3$ and more preferably greater than 3.0 $mg/mm^3$. The mass density of the cathode layer is preferably less than 1.0 $mg/mm^3$, more preferably less than 0.5 $mg/mm^3$ and more preferably less than 0.3 $mg/mm^3$.

The desired electrochemical surface area/volume ratios and mass densities may be obtained by appropriate choice of catalyst support particles and distribution of those particles in the electrode layer.

The anode layer preferably comprises a thin layer of nanostructured elements, which comprise catalyst supported on nanostructured particles. U.S. Pat. No. 5,879,828, incorporated herein by reference, concerns MEAs having electrode layers comprising nanostructured elements. U.S. Pat. No. 5,879,827, also incorporated herein by reference, concerns nanostructured elements bearing nanoscopic catalyst articles which are preferred for use in the hybrid MEAs of the present invention.

The process for preparing the anode layer involves deposition of catalyst material onto oriented acicular non-conductive support particles previously arrayed on an initial substrate, then transfer of that film of catalyst support particles to the surface of an ion conducting membrane (ICM). The catalyst is applied to the outer surface of the support particles and the catalyst support particles are localized within a layer 2 micrometers thick or more preferably 1 micrometer thick. Pt particles are distributed over larger non-conductive, acicular shaped support particles located at the surface of the ICM. In one embodiment, the Pt catalyst particles are seen in transmission electron micrographs as black dots, estimated to be less than about 5 nm in size, decorating pieces and fragments of non-conductive support particles. The support particles may be embedded within the membrane or partially embedded. The support particles need have no spatial characteristic in common other than that they are localized within a very thin layer, preferably less than 2 microns thick, at the surface of the ICM. For a given catalyst loading (in $mg/cm^2$) the electrochemical activity of the catalyst electrode is directly related to the active surface area of that catalyst. That surface area is in turn determined by the number of catalyst particles and their sizes, since the smaller the particle the higher the surface area to volume ratio. For high catalyst activities in fuel cell electrodes, catalyst particles with dimensions in the range of 2–10 nm are desirable.

For the purpose of illustration, if 0.025 $mg/cm^2$ of Pt catalyst is dispersed into 2.5 nm diameter particles, distributed into a membrane surface layer 1 micrometer thick, then the number density of particles in this surface region would be $14 \times 10^{17}/cm^3$. This is an order of magnitude larger than the number density that would be found for similar sized catalyst particles if they were supported on typical carbon particles, which occupy a much larger volume, and which are typically applied in layer thickness of at least 10 microns.

The catalyst support of the anode layer of the MEA of the present invention also shows improved weight per cent loading of catalyst. The acicular support particles can support much higher weight percentages of catalyst while the catalyst particle size remains relatively small. This distinguishes commonly used carbon particles. For example, a common catalyst currently sold by E-tek, Inc., Natick, Mass., for use in fuel cells is 10 to 40 wt % Pt on Vulcan XC-72 carbon black. Higher weight percents, beyond 80%, lead to larger catalyst particles and lower specific surface area of the catalyst. For example, catalyst particles composed of 80% Pt on Vulcan XC-72 carbon black have an average particle size of 25 nm (see, e.g., E-tek 1995 Catalog). Additional data appear in Table I:

TABLE I

| Catalyst | Average Pt Particle Size (Angstroms) |
|---|---|
| Vulcan XC-72 only | — |
| 10% Pt on Vulcan XC-72 | 20 |
| 20% Pt on Vulcan XC-72 | 25 |
| 30% Pt on Vulcan XC-72 | 32 |
| 40% Pt on Vulcan XC-72 | 39 |
| 60% Pt on Vulcan XC-72 | 88 |

TABLE I-continued

| Catalyst | Average Pt Particle Size (Angstroms) |
|---|---|
| 80% Pt on Vulcan XC-72 | 250 |
| Fuel Cell Grade Pt Black | 100 |

In one contrasting embodiment, nanostructured support particles have a mass density of 0.005 mg/cm$^2$ and are coated with at least 0.025 mg/cm$^2$ of platinum, representing a catalyst wt % of 83.3. Transmission electron micrographs demonstrate that catalyst particle size is still on the order of 4 nm even at that 83.3% loading. Hence, in contrast to conventional catalyst supports, nanostructured support particles can support extremely high wt % loadings of catalyst without loss of the desirable small sized particles having a high surface area-to-volume ratio.

The use of nanostructured elements in the anode layer is one factor allowing an extremely high weight percent loading of catalyst, while still obtaining small catalyst particles having a high surface area-to-volume ratio. This is due to 1) nucleation of the catalyst into small distinct particles as it is deposited on the support particles, 2) the density of distinct catalyst particles on the surface of each element, 3) the acicular shape of the nanostructured elements, and 4) the large number of elements per unit area.

Nanostructured elements suitable for use in the present invention may comprise metal-coated whiskers of organic pigment, most preferably C.I. PIGMENT RED 149 (perylene red). The crystalline whiskers have substantially uniform but not identical cross-sections, and high length-to-width ratios. The nanostructured whiskers are coated with materials suitable for catalysis that endow the whiskers with a fine nanoscopic surface structure capable of acting as multiple catalytic sites.

The cathode layer may comprise catalyst supported on carbon particles. Such conventional supported catalysts are typically prepared by wet chemical methods, such as the reduction of chloroplatinic acid, and supported on carbon support particles. This conventional form of catalyst is dispersed with ionomeric binders, solvents and often polytetrafluoroethylene (PTFE) particles, to form an ink, paste or dispersion that is applied to either the membrane or the electrode backing material. In addition to mechanical support, it is generally believed in the art that the carbon support particles provide necessary electrical conductivity within the electrode layer.

In another variation, a catalyst metal salt is reduced in an organic solution of a solid polymer electrolyte to form a distribution of catalyst metal particles in the electrolyte without a support particle. The solid polymer electrolyte is then cast onto an electrode backing layer to form the catalyst electrode.

In a further variation, Pt fines are mixed directly with a solution of solvents and optionally polymer electrolyte and Teflon™ and coated onto the electrode backing layer. However, because of limitations on how small the fines can be made and the stability of the dispersion, this approach results in very high, and therefore expensive, loading of the catalyst.

The cathode layer may also comprise nanostructured elements if they are dispersed so as to obtain a desired catalyst distribution. For this purpose, nanostructured elements may be dispersed in a suspension which may comprise ionomeric binders, solvents and often polytetrafluoroethylene (PTFE) particles, to form an ink, paste or dispersion that is applied to either the membrane or the electrode backing material. Nanostructured elements may be separated from their substrate and suspended by any suitable method, including fluid jets such as air, water, or other solvent, scraping, ultrasonic vibration, freeze fracturing, and the like.

The cathode layer may alternately combine a nanostructured catalyst layer and a dispersed catalyst layer if the desired catalyst distribution is obtained for the combined cathode layer.

It has been found that the advantages of the present invention are better realized with use of thinner polymer electrolyte membranes, preferably about 50 micrometers or less (e.g., Nafion™ 112) and more preferably about 25 micrometers or less. Preferably, the membrane is stretched such that it is reduced in thickness prior to incorporation in the MEA. In one preferred embodiment a Nafion™ 112 membrane is uniaxially or biaxially stretched to reduce its thickness by about half.

This invention is useful in electrochemical devices such as fuel cells, electrolyzers, batteries, or gas, vapor or liquid sensors, using membrane electrodes optimized for the immediate purpose.

Objects and advantages of this invention are further illustrated by the following examples, but the particular materials and amounts thereof recited in these examples, as well as other conditions and details, should not be construed to unduly limit this invention.

EXAMPLES

Nanostructured elements

In the following examples, the nanostructured catalyst supports were made according to the process described in U.S. Pat. No. 5,338,430, and other patents referenced therein, all incorporated herein by reference. Nanostructured perylene red (PR149, American Hoechst Corp., Somerset, N.J.) films on polyimide substrates were made using the techniques described in U.S. Pat. Nos. 4,812,352 and 5,039,561 by thermal evaporation and vacuum annealing of the organic pigment C.I. Pigment Red 149, i.e., N,N'-di(3,5-xylyl)perylene-3,4:9,10-bis(dicarboximide). After deposition and annealing, highly oriented crystal structures were formed with large aspect ratios, controllable lengths of about 0.5 to 2 micrometers, widths of about 0.03–0.05 micrometer and areal number density of approximately 30 whiskers per square micrometer, oriented substantially normal to the polyimide substrate. These microstructure catalyst supports are nonconductive until coated with a metal catalyst and separate readily from the polyimide substrate when pressed into an ICM. Catalyst material was coated on the whiskers by e-beam deposition.

Measurement of catalyst loading was done by a simple gravimetric method after deposition. A sample of the polyimide-supported nanostructured film layer was massed using a digital balance accurate to about one microgram. Then the nanostructured layer as wiped off the polyimide substrate using a paper tissue or linen cloth, and the substrate was remassed. Because a preferred property of the nanostructured catalyst support is that it transfer easily and completely to the ion exchange membrane, it also was easily removed by simple wiping with a cloth. The mass per unit area of the catalyst support particles, without Pt, was also measured this way.

Nanostructured elements were incorporated into MEAs using a static pressing procedure or a nip rolling procedure.

The static pressing procedure consisted of transfer of the catalyst-coated nanostructured elements into the Nafion membrane by pressing under vacuum at 130° C. and a pressure of 160 MPa. The nip-rolling procedure consisted of transfer of the catalyst-coated nanostructured elements into the membrane by application of 0.75 MPa of cylinder pressure at 185° C. at web speed of 0.3 m/min.

Catalyst densities (mg/mm$^3$) were calculated by dividing the catalyst loading (mg/mm$^2$) by the average layer thickness. Average catalyst layer thicknesses were determined by inspection from scanning electron microscope images of layer cross-sectional sections. For dispersed catalyst layers, catalyst mass was measured by a simple gravimetric method after ink-coating a specific area. The substrate to be catalyzed was weighed, the catalyst was applied and the catalyzed substrate was dried and re-weighed. The weight of Pt deposited was calculated from the total weight of deposit multiplied by the weight per cent of Pt in the non-volatile components of the ink. Catalyst loading was calculating by dividing catalyst mass by the area of the surface coated.

Catalyst electrochemical surface area/volume ratios (cm$^2$/mm$^3$) for nanostructured electrode layers were determined using nanostructured elements essentially equivalent to those used in the Examples below. (The test whiskers are shorter than those appearing in the Examples, and therefore densities may be greater in the Examples.) Nanostructured samples for the experimental procedure were prepared on gold substrates, which were polished with 0.5 µm particle size alumina on a polishing pad with water as lubricant. Gold was chosen for its lack of electrochemical activity in the potential window under study, inertness and low background currents. Perylene red whiskers were grown on the substrates, as described above, by evaporative deposition of 50 nm of perylene red followed by annealing in an oven at 240–245° C. These were covered with various amounts of Pt by vacuum deposition to form working electrodes.

Samples were mounted in sample holder and placed in heated 3-electrode electrochemical cell. Experimental data were collected using a PAR 263 voltammetric analyzer, the working electrode described above, having 0.95 cm$^2$ active area, a Pt counter electrode, deaerated 1.0 M $H_2SO_4$ as electrolyte, and under a $N_2$ blanket. Electrode electrochemical pretreatment involved cycling the electrode between −0.24 V/SCE and 1.26 V/SCE at 25 mV/s for 10 cycles, starting potential 0.5 V/SCE, followed by cycling between −0.44 V/SCE and 1.66 V/SCE at 25 mV/s for 10 cycles, starting potential 0.5 V/SCE, followed by 10 cycles between −0.24 V/SCE and 0.5 V/SCE also at 25 mV/s with the last cycle recorded. In order to limit the influence of noise levels on measurement the entire electrochemical cell was enclosed in a Faraday cage.

The electrochemically accessible surface determination was based on the phenomena of $H_2$ adsorption/desorption on Pt at the potential immediately preceding hydrogen evolution. It is known that hydrogen will adsorb on a Pt surface and will exchange 220 µC of charge per 1 cm$^2$ of Pt area in the process. By integration of adsorption/desorption peaks of hydrogen a real-to-geometrical surface area factor can be calculated. The region of voltammogram used for charge integration was between −0.2 and 0.1 V/SCE and was background corrected. The baseline, consisting mainly of charging currents and any impurities present in a system, was estimated based on the 0.1 to 0.4 V/SCE potential window, where no electrochemistry is expected on Pt in 1.0 M $H_2SO_4$ electrolyte. In addition, values of charge exchanged during voltammetric sweep were averaged over negative and positive going scans.

For the nanostructured catalyst, the value of electrochemical surface area thus obtained for Pt catalyst loadings between 13 µg/cm$^2$ and 650 µg/cm$^2$ was 8.2 m$^2$/g. For loading of 0.2 mg/cm$^2$ of Pt, this corresponds to 16.4 cm$^2$ of electrochemically active catalyst surface per 1 cm$^2$ of planar electrode area. Since the thickness of nanostructured catalyst of 0.2 mg/cm$^2$ of Pt as deposited onto membrane is between 0.2 and 0.5 µm (see, e.g., U.S. Pat. No. 5,879,828, incorporated herein by reference), the electrochemical surface area to volume ratio of this catalyst is between 300–800 cm$^2$/mm$^3$. The surface area may be somewhat higher in the examples below because longer nanostructured elements were used.

Dispersed Catalyst Layers

The dispersed catalyst layers used in the following examples were trilayers made by coating a catalyst composition layer on a 0.28 cm (0.011") thick bilayer electrode backing material, comprised of a Toray paper electrode backing layer coated with a carbon/teflon layer (International Fuel Cells, South Windsor, Conn.). A comparable coated Toray in the practice of the present invention was shown to be Model #39-GDE-501 available from Johnson Mathey (Reading, Berkshire, England). The catalyst layer was applied onto the coated Toray as a dispersion in water and isopropanol. The catalyst composition layer contained 39% by weight of 30% Pt/C (E-tek, Inc., Natick, Mass.), 41% of glycerin and 20% of Nafion™ 1000. The thickness of the catalyst layer ranged from 10 µm to 30 µm.

Other dispersed catalyst layers used in the following examples were made by coating a catalyst layer on a 430 µm thick ELAT™ gas diffusion electrode available from E-Tek, Natick, Mass. Catalyzed carbon used for ink making was 30% Pt/C obtained from E-Tek, Natick, Mass. Catalyst composition was 670 mg of 5% (w/o) Nafion™ 1000 solution in lower alcohols (DuPont Chemicals, Wilmington, Del.), 67 mg of 30% Pt/C and 75 mg of glycerin. Catalyst was applied by simple brushing method in such a way that resulted in coverage between 183 and 266 µg of Pt per 1 cm$^2$ of planar area of the electrode.

For dispersed catalyst, the catalyst electrochemical surface area per unit volume was calculated using surface area and thickness data reported by the manufacture in Ralph et al, Low Cost Electrodes for Proton Exchange Membrane Fuel Cells, *J. Electrochem. Soc.* Vol. 144, No. 11, (November 1997) at Table I page 3848 and at page 3851.

ICM

The ion conducting membranes used were perfluorinated sulfonic acid materials, specifically, Nafion™ 112 membranes (DuPont Chemicals, Wilmington, Del., available from ElectroChem, Inc., Woburn, Mass., and Aldrich Chemical Co., Inc., Milwaukee, Wis.). Before use, the Nafion™ membrane was pretreated by sequentially immersing into a) boiling water for one hour, b) boiling 3% $H_2O_2$ for one hour, c) boiling ultra pure $H_2O$ for 1 hour, d) boiling 0.5 M $H_2SO_4$ for one hour, e) boiling ultra pure DI $H_2O$ for one hour. The membrane was then stored in ultrapure DI water until use. Prior to forming an MEA the membrane was dried by laying it between several layers of clean linen cloth at 30° C. for 10–20 minutes. The membranes were then stretched with a Film Stretcher (T. M. Long Co., Inc.; Somerville, N.J.) equipped with a 4×4 stretching head. The thickness of the membranes was thereby reduced from 50 micrometers to about 25 micrometers.

Example 1

Four MEAs were constructed having the electrode composition noted in Table II. MEAs No. 1, 3 and 4 are comparative and MEA No. 2 exemplifies the present invention.

TABLE II

| MEA No. | Anode | Cathode |
|---|---|---|
| 1C | Nanostructured | Nanostructured |
| 2 | Nanostructured | Dispersed |
| 3C | Dispersed | Nanostructured |
| 4C | Dispersed | Dispersed |

MEA's having nanostructured elements on both electrode surfaces were prepared as follows: A three-layer MEA with 5 cm² of active area was prepared by a static pressing method. Two 5 cm² square pieces of ~1.5 μm long nanostructured elements on a polyimide substrate—one for the anode, one for the cathode—were placed on either side of the center of a 7.6 cm×7.6 cm Nafion™ membrane prepared as indicated above. A 50 micrometer thick, 7.6 cm×7.6 cm sheet of polyimide was placed on each side of the catalyst coated substrate/Nafion/catalyst coated substrate sandwich. This assembly was then placed between two steel shim plates and pressed under a low grade vacuum at 130° C. and a pressure of 160 MPa using a Carver lab press (Carver Inc., Wabash, Ind.). A low grade vacuum (less than about 2 Torr) was applied to partially remove air from the stack just prior to applying the maximum pressure. The original 5 cm² polyimide substrates were then peeled away leaving the catalyst attached to the surface of the Nafion membrane. For preparation of a five-layer MEA, the above three-layer MEA was covered with 0.28 cm (0.011") thick Toray type GDE electrode backing material. The Toray type GDE electrode backing material was uniformly brushed with glycerin before attachment. The assembly was then placed between two 200 micrometers thick Teflon™ coated fiberglass gaskets (The Furon Co., CHR Division, New Haven, Conn.) each having a in a 5 cm² square hole cut to match the catalyst area. A 50 micrometer thick, 7.6 cm×7.6 cm sheet of polyimide was then placed on each side. This assembly was then placed between two steel shim plates and pressed under a low grade vacuum at 130° C. and a pressure of 2.8 MPa using a Carver lab press (Carver Inc., Wabash, Ind.). A low grade vacuum (less than about 2 Torr) was applied to partially remove air from the stack just prior to applying the maximum pressure. The polyimide sheets were then peeled away leaving the five-layer MEA having nanostructured elements on both electrode surfaces.

MEAs having nanostructured elements on one electrode surface and dispersed catalyst on the second surface were prepared as follows: For preparation of a two-layer MEA with 5 cm² of active area by a static pressing method, one 5 cm² square piece of the nanostructured elements on a polyimide substrate was placed on one side of the center of a 7.6 cm×7.6 cm stretched Nafion membrane. A 50 micrometer thick, 7.6 cm×7.6 cm sheet of polyimide was placed on each side of the catalyst coated substrate/Nafion bilayer. This assembly was then placed between two steel shim plates and pressed under a low grade vacuum at 130° C. and a pressure of 160 MPa using a Carver lab press (Carver Inc., Wabash, Ind.). A low grade vacuum (less than about 2 Torr) was applied to partially remove air from the stack just prior to applying the maximum pressure. The original 5 cm² polyimide substrate was then peeled away leaving the catalyst attached to one side (anode side) of the Nafion membrane. This two-layer MEA was covered with 0.28 cm (0.011") thick Toray type GDE electrode backing material (JM). The assembly was then placed between two 200 micrometers thick Teflon™ coated fiberglass gaskets (The Furon Co., CHR Division, New Haven, Conn.) each having a in a 5 cm² square hole cut to match the catalyst area. The Toray type GDE electrode backing material on anode side was wetted by glycerin, and attached to the nanostructured catalyst surface of the two layer MEA. The Toray type GDE electrode backing material on the cathode side was coated by brush with an ink composed of 8 wt % of 30% Pt/C (E-tek, Inc., Natick, Mass.), 4 wt % of Nafion™ 1000, 9 wt % of glycerin, 79 wt % water/isopropanol mixture to a thickness of 10 micron and Pt loading of 0.3 mg/cm², dried at 60° C. under vacuum for 10 mins, then attached to the membrane side. A 50 micrometer thick, 7.6 cm×7.6 cm sheet of polyimide was placed on each side. This assembly was then placed between two steel shim plates and pressed under a low grade vacuum at 130° C. and a pressure of 2.8 MPa using a Carver lab press (Carver Inc., Wabash, Ind.). A low grade vacuum (less than about 2 Torr) was applied to partially remove air from the stack just prior to applying the maximum pressure. The polyimide sheets were then peeled away leaving the five-layer MEA with nanostructured elements on one electrode surface and dispersed catalyst on the second surface.

MEAs having dispersed catalyst on both surfaces were prepared as follows: Toray type GDE electrode backing material (275 micrometer) were coated by brush with an ink composed of 8 wt % of 30% Pt/C (E-tek, Inc., Natick, Mass.), 4 wt % of Nafion™ 1000, 9 wt % of glycerin, 79 wt % water/isopropanol mixture to a thickness of 10 microns and Pt loading of 0.3 mg/cm², then dried at 60° C. under vacuum for 10 minutes to form a catalyst-coated GDE. The assembly was then placed between two 200 micrometers thick Teflon™ coated fiberglass gaskets (The Furon Co., CHR Division, New Haven, Conn.) each having a in a 5 cm² square hole cut to match the catalyst area. A 50 micrometer thick, 7.6 cm×7.6 cm sheet of polyimide was placed on each side. This assembly was then placed between two steel shim plates and pressed under a low grade vacuum at 130° C. and a pressure of 2.8 MPa using a Carver lab press (Carver Inc., Wabash, Ind.). A low grade vacuum (less than about 2 Torr) was applied to partially remove air from the stack just prior to applying the maximum pressure. The polyimide sheets were then removed leaving the five-layer MEA with dispersed catalyst on both electrode surfaces.

Values of catalyst density (mg/mm³), catalyst electrochemical surface area/volume ratio (cm²/mm³) and catalyst layer thickness for the nanostructured and dispersed electrode layers used in the present examples are reported in Table III:

TABLE III

| Catalyst Layer | Pt Loading (mg/cm²) | Catalyst density (mg/mm³) | Catalyst electrochemical surface area/volume ratio (cm²/mm³) | Catalyst layer thickness (μm) |
|---|---|---|---|---|
| Nanostructured | 0.20 | 4.0 | 320 | 0.5 |
| Dispersed | 0.30 | 0.3 | 180 | 10 |

In the Examples herein, five-layer MEA's were mounted in a test cell station (Fuel Cell Technologies, Inc., Albuquerque, N. Mex.). The test station includes a variable electronic load with separate anode and cathode gas handling systems to control gas flow, pressure and humidity. The electronic load and gas flow are computer controlled.

Fuel cell polarization curves were obtained under the following test parameters: electrode area, 5 cm²; cell temperature, 65° C., anode gas pressure 0.1 MPa; anode gas flow rate, 100 standard cc/min; anode humidification temperature, 65° C.; cathode gas pressure 0.1 MPa; cathode flow rate, 300 standard cc/min; cathode humidification temperature, 65° C. Humidification of the cathode gas streams was provided by passing the gas through sparge bottles maintained at the stated temperatures. Humidification of the anode gas streams was provided by pumping 0.05 cc/min water via a HPLC pump through a heated pipe at the stated temperatures. Each fuel cell was brought to operating conditions at 65° C. under hydrogen and air flows. Test protocols were initiated after 24 hours of operation and the following variables were measured: anode pressure, anode flow, cathode pressure, cathode flow, and cell temperature.

FIG. 1 shows the polarization curves obtained for these four MEAs. The curves demonstrate significantly higher performance for MEA No. 2, the hybrid MEA having a nanostructured anode and dispersed cathode. More specifically, MEA No. 2 achieves higher power output over all portions of the current density/voltage curve.

Example 2

Two MEAs were constructed which exemplify the present invention. MEA No. 5 had a nanostructured anode and a dispersed cathode. MEA No. 6 had a nanostructured anode and a gradient cathode, which is a nanostructured cathode overlayed with a dispersed cathode layer to form a composite cathode layer having a density gradient.

The MEAs were prepared as follows:

The dispersed catalyst layers used in the following examples were made by coating a catalyst layer on a 430 $\mu$m thick ELAT™ gas diffusion electrode available from E-Tek, Natick, Mass. The ink was composed of 8 wt % of 30% Pt/C (E-tek, Inc., Natick, Mass.), 4 wt % of Nafion™ 1000, 9 wt % of glycerin, 79 wt % water/isopropanol mixture. Ink was applied by simple brushing method that resulted in coverage between 183 and 266 $\mu$g of Pt per 1 $cm^2$ of planar area of the electrode.

Nanostructured elements were incorporated into each MEA using a nip-rolling procedure which consisted of transfer of the catalyst-coated nanostructured elements into the stretched Nafion 112 membrane. The nip-rollers used were 7.5 cm diameter cylinders under 0.75 MPa of pressure. The rollers were heated to 185° C. The web speed was 0.3 m/min. One or two-sided transfer was used, depending on the MEA.

An MEA having nanostructured elements on one side only was prepared as follows: A two-layer MEA with 50 $cm^2$ of active area was prepared by a nip-rolling method. One 50 $cm^2$ square piece of the nanostructured elements on a polyimide substrate for the anode was placed on one side of the center of a 10 cm×10 cm Nafion™ membrane prepared as indicated above. A 50 micrometer thick, 10 cm×10 cm sheet of polyimide was placed on each side of the catalyst coated substrate/Nafion sandwich. This assembly was then placed between two larger pieces of polyimide and run through the rollers. The original 50 $cm^2$ polyimide substrate was then peeled away leaving the catalyst attached to one surface of the Nafion membrane.

For preparation of a five-layer MEA, the above two-layer MEA was covered on the catalyzed side with 430 $\mu$m ELAT electrode backing material. The ELAT electrode backing material was wetted by Nafion 1000/glycerin solution (prepared by mixing equal volumes of 5% Nafion 1000 solution and glycerin) before attachment. The resulting Nafion loading of a diffuser was 31.2 $\mu$g/$cm^2$. The non-catalyzed side of the two-layer MEA was placed against 7.1 cm by 7.1 cm piece of catalyzed ELAT having 183 $\mu$g of Pt per 1 $cm^2$ of planar area of the electrode. The assembly was then placed between two 200 micrometers thick Teflon™ coated fiberglass gaskets (The Furon Co., CHR Division, New Haven, Conn.) each having a in a 5 $cm^2$ square hole cut to match the catalyst area. A 50 $\mu$m thick, 10 cm×10 cm sheet of polyimide was then placed on each side. This assembly was then placed between two steel shim plates and pressed using a Carver lab press (Carver Inc., Wabash, Ind.) at 135° C. and a pressure of 2 MPa for 600 s followed by 5 MPa for 30 seconds. The polyimide sheets were then removed leaving the five-layer MEA with nanostructured elements on one electrode surface and dispersed catalyst on the second surface.

MEAs having nanostructured elements on both electrode surfaces were prepared as follows: A three-layer MEA with 50 $cm^2$ of active area was prepared by a nip-rolling method. Two 50 $cm^2$ square pieces of the nanostructured elements on a polyimide substrate—one for the anode, one for the cathode—were placed on either side of the center of a 10 cm×10 cm Nafion™ membrane prepared as indicated above. A 50 micrometer thick, 10 cm×10 cm sheet of polyimide was placed on each side of the catalyst coated substrate/Nafion/catalyst coated substrate sandwich. This assembly was then placed between two larger pieces of polyimide and run through the rollers. The original 50 $cm^2$ polyimide substrates were then peeled away leaving the catalyst attached to the surface of the Nafion membrane.

For preparation of a five-layer gradient MEA (MEA No. 6), the anodic catalyzed side of the above three-layer MEA was covered with 50 $cm^2$ 430 $\mu$m thick piece of ELAT electrode backing material. The ELAT electrode backing material was wetted by brushing with Nafion 1000/glycerin solution (prepared by mixing equal volumes of 5% Nafion 1000 solution and glycerin) before attachment. The resulting Nafion coating weight was 28.9 $\mu$g/$cm^2$. The catalyzed cathode side of the three-layer MEA was placed against a 7.1 cm by 7.1 cm piece of ELAT catalyzed with 266 $\mu$g of Pt per 1 $cm^2$ of planar area of the electrode. The assembly was then placed between two 200 micrometers thick Teflon™ coated fiberglass gaskets (The Furon Co., CHR Division, New Haven, Conn.) each having a in a 5 $cm^2$ square hole cut to match the catalyst area. A 50 $\mu$m thick, 10 cm×10 cm sheet of polyimide was then placed on each side. This assembly was then placed between two steel shim plates and pressed using a Carver lab press (Carver Inc., Wabash, Ind.) at 135° C. and a pressure of 2 MPa for 600 s followed by 5 MPa for 30 seconds. The polyimide sheets were then peeled away leaving the five-layer MEA with nanostructured elements on one electrode surface and both nanostructured and dispersed catalyst on the second surface.

For testing, the above five-layer MEAs were mounted in single cells and connected to a fuel cell test station (Fuel Cell Technologies, Inc., Albuquerque, N. Mex.). The test station includes a variable electronic load with separate anode and cathode gas handling systems to control gas flow, pressure and humidity. The electronic load and gas flows are computer controlled.

Fuel cell polarization curves were obtained under the following test parameters: electrode area, 50 $cm^2$; cell temperature, 75° C., reactants $H_2/O_2$, anode gas pressure 0.1 MPa; anode gas flow rate, 800 standard $cm^3$/min; anode water delivery between 0.7 and 1.0 mL/min; cathode gas pressure 0.1 MPa; cathode flow rate, 400 standard $cm^3$/min; cathode water delivery 0.18 mL/min. Steam injectors provided humidification of the gas streams.

Figure 2:
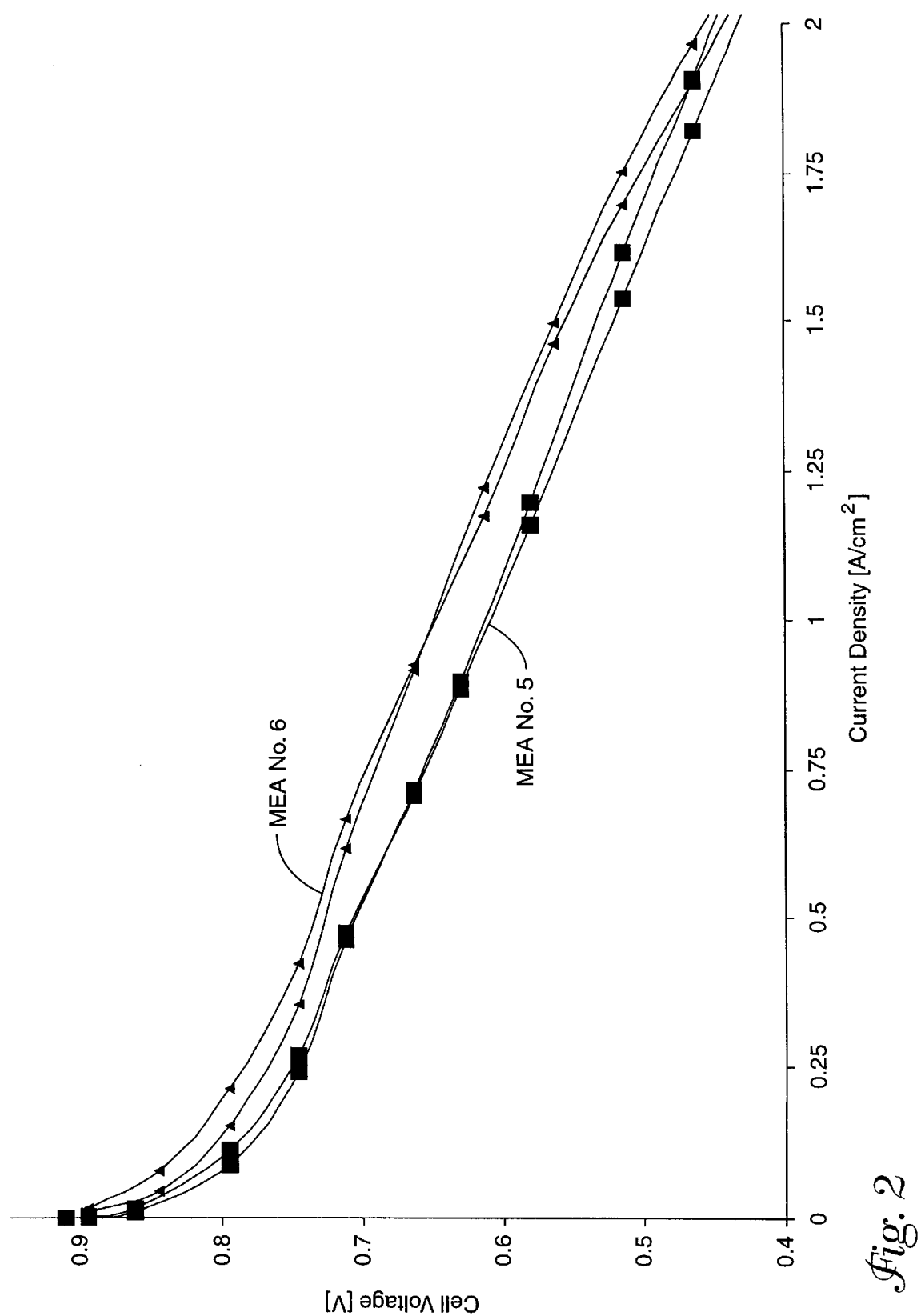
FIG. 2 is a graph of polarization curves measured for two hybrid MEAs of the present invention.

FIG. 2 shows the polarization curves obtained for these two MEAs. The curves demonstrate somewhat higher performance for MEA No. 6, the hybrid MEA having a nanostructured anode and gradient cathode.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A membrane electrode assembly (MEA) having an anode layer comprising a first catalyst material borne on first support particles and a cathode layer comprising second catalyst material borne on second support particles, wherein the average density of the first catalyst material in the anode layer is greater than 1.0 mg/mm$^3$, wherein the average density of the second catalyst material in the cathode layer is less than 1.0 mg/mm$^3$.

2. The membrane electrode assembly (MEA) of claim 1 wherein the average density of the first catalyst material in the anode layer is greater than 2.0 mg/mm$^3$ and wherein the average density of the second catalyst material in the cathode layer is less than 0.5 mg/mm$^3$.

3. The membrane electrode assembly (MEA) of claim 1, wherein the electrochemical surface area/volume ratio of the first catalyst material in the anode layer is greater than 200 cm$^2$/mm$^3$ and wherein the electrochemical surface area/volume ratio of the second catalyst material in the cathode layer is less than 200 cm$^2$/mm$^3$.

4. The membrane electrode assembly (MEA) of claim 1, wherein the electrochemical surface area/volume ratio of the first catalyst material in the anode layer is greater than 300 mm$^2$/mm$^3$ and wherein the electrochemical surface area/volume ratio of the second catalyst material in the cathode layer is less than 150 cm$^2$/mm$^3$.

5. The membrane electrode assembly (MEA) of claim 1 wherein said first support particles have an average aspect ratio of greater than 3 and wherein said second support particles have an average aspect ratio of less than 3.

6. The membrane electrode assembly (MEA) of claim 1 wherein said first catalyst material comprises nanostructured elements.

7. The membrane electrode assembly (MEA) of claim 1 wherein the anode layer is less than 2 micrometers thick.

8. The membrane electrode assembly (MEA) of claim 1 wherein the anode layer is less than 1 micrometer thick.

9. The membrane electrode assembly (MEA) of claim 1 wherein the cathode layer is greater than 5 micrometer thick.

10. The membrane electrode assembly (MEA) of claim 1 wherein the cathode layer is greater than 10 micrometer thick.

11. A membrane electrode assembly (MEA) having an anode layer comprising a first catalyst material and a cathode layer comprising a second catalyst material, wherein the electrochemical surface area/volume ratio of the first catalyst material in the anode layer is greater than 200 cm$^2$/mm$^3$ and wherein the electrochemical surface area/volume ratio of the second catalyst material in the cathode layer is less than 200 cm$^2$/mm$^3$.

12. The membrane electrode assembly (MEA) of claim 11 wherein the electrochemical surface area/volume ratio of the first catalyst material in the anode layer is greater than 300 cm$^2$/mm$^3$ and wherein the electrochemical surface area/volume ratio of the second catalyst material in the cathode layer is less than 150 cm$^2$/mm$^3$.

13. The membrane electrode assembly (MEA) of claim 11 wherein the average density of the first catalyst material in the anode layer is greater than 1.0 mg/mm$^3$ and wherein the average density of the second catalyst material in the cathode layer is less than 1.0 mg/mm$^3$.

14. The membrane electrode assembly (MEA) of claim 11 wherein the average density of the first catalyst material in the anode layer is greater than 2.0 mg/mm$^3$ and wherein the average density of the second catalyst material in the cathode layer is less than 0.5 mg/mm$^3$.

15. The membrane electrode assembly (MEA) of claim 11 wherein said first catalyst material is borne on first support particles having an average aspect ratio of greater than 3 and wherein said second catalyst material is borne on second support particles having an average aspect ratio of less than 3.

16. The membrane electrode assembly (MEA) of claim 11 wherein said first catalyst material comprises nanostructured elements.

17. The membrane electrode assembly (MEA) of claim 11 wherein the anode layer is less than 2 micrometers thick.

18. The membrane electrode assembly (MEA) of claim 11 wherein the anode layer is less than 1 micrometer thick.

19. The membrane electrode assembly (MEA) of claim 11 wherein the cathode layer is greater than 5 micrometer thick.

20. The membrane electrode assembly (MEA) of claim 11 wherein the cathode layer is greater than 10 micrometer thick.

21. A membrane electrode assembly (MEA) having an anode layer comprising a first catalyst material borne on first support particles and a cathode layer comprising a second catalyst material borne on second support particles, wherein said first support particles have an average aspect ratio of greater than 3 and wherein said second support particles have an average aspect ratio of less than 3.

22. The membrane electrode assembly (MEA) of claim 21 wherein the average density of the first catalyst material in the anode layer is greater than 1.0 mg/mm$^3$ and wherein the average density of the second catalyst material in the cathode layer is less than 1.0 mg/mm$^3$.

23. The membrane electrode assembly (MEA) of claim 21 wherein the average density of the first catalyst material in the anode layer is greater than 2.0 mg/mm$^3$ and wherein the average density of the second catalyst material in the cathode layer is less than 0.5 mg/mm$^3$.

24. The membrane electrode assembly (MEA) of claim 21, wherein the electrochemical surface area/volume ratio of the first catalyst material in the anode layer is greater than 200 cm$^2$/mm$^3$ and wherein the electrochemical surface area/volume ratio of the second catalyst material in the cathode layer is less than 200 cm$^2$/mm$^3$.

25. The membrane electrode assembly (MEA) of claim 21, wherein the electrochemical surface area/volume ratio of the first catalyst material in the anode layer is greater than 300 cm$^2$/mm$^3$ and wherein the electrochemical surface area/volume ratio of the second catalyst material in the cathode layer is less than 150 cm$^2$/mm$^3$.

26. The membrane electrode assembly (MEA) of claim 21 wherein said first catalyst material comprises nanostructured elements.

27. The membrane electrode assembly (MEA) of claim 21 wherein the anode layer is less than 2 micrometers thick.

28. The membrane electrode assembly (MEA) of claim 21 wherein the anode layer is less than 1 micrometer thick.

29. The membrane electrode assembly (MEA) of claim 21 wherein the cathode layer is greater than 5 micrometer thick.

30. The membrane electrode assembly (MEA) of claim 21 wherein the cathode layer is greater than 10 micrometer thick.

* * * * *

UNITED STATES PATENT AND TRADEMARK OFFICE
CERTIFICATE OF CORRECTION

PATENT NO. : 6,238,534 B1
DATED : May 29, 2001
INVENTOR(S) : Mao, Shane S.

It is certified that error appears in the above-identified patent and that said Letters Patent is hereby corrected as shown below:

Column 6,
Line 58, "layer as wiped" should read -- layer was wiped --

Column 7,
Line 20, "calculating" should read -- calculated --

Column 9,
Line 37, "having a in a 5 cm$^2$ square hole" should read -- having a 5 cm$^2$ square hole --

Column 10,
Lines 3 and 34-35, "having a in a 5 cm$^2$ square hole" should read -- having a 5 cm$^2$ square hole --

Column 12,
Lines 6 and 43, "having a in a 5 cm$^2$ square hole" should read -- having a 5 cm$^2$ square hole --
Lines 11 and 48, "for 600 s" should read -- for 600s --

Signed and Sealed this

Third Day of August, 2004

JON W. DUDAS
*Acting Director of the United States Patent and Trademark Office*